(12) United States Patent
Burg et al.

(10) Patent No.: US 6,751,464 B1
(45) Date of Patent: Jun. 15, 2004

(54) DATA HANDLING SYSTEM AND METHOD THEREFOR

(75) Inventors: Bernard Joseph Burg, Paris (FR); William Neil Robinson, Weybourne (GB); Philippe Sartori, Chastres (FR); Nicolas Dubois, Rueil Malmaison (FR); Abdelkrim Benamar, Chelles (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/646,022

(22) PCT Filed: Apr. 15, 1999

(86) PCT No.: PCT/EP99/02580

§ 371 (c)(1), (2), (4) Date: Feb. 22, 2001

(87) PCT Pub. No.: WO99/55103

PCT Pub. Date: Oct. 28, 1999

(30) Foreign Application Priority Data

Apr. 17, 1998 (EP) .............................................. 98400960

(51) Int. Cl.⁷ ................................................. H04Q 7/20
(52) U.S. Cl. ................. 455/466; 455/432.1; 455/435.1; 370/331; 370/338; 709/202
(58) Field of Search .............................. 455/456.1, 466, 455/432.1, 435.1, 419, 414.1; 709/202, 250; 370/338, 328, 329, 401, 331–333

(56) References Cited

U.S. PATENT DOCUMENTS

| 5,732,383 A | * | 3/1998 | Foladare et al. ............. 455/456 |
| 5,825,759 A | * | 10/1998 | Liu ............................. 370/331 |
| 5,956,331 A | * | 9/1999 | Rautiola et al. ............. 370/338 |
| 6,049,819 A | * | 4/2000 | Buckle et al. ............... 709/202 |
| 6,115,736 A | * | 9/2000 | Devarakonda et al. ...... 709/202 |
| 6,122,268 A | * | 9/2000 | Okanoue et al. ............. 370/338 |
| 6,167,248 A | * | 12/2000 | Hamalainen et al. ........ 455/403 |
| 6,243,758 B1 | * | 6/2001 | Okanoue ..................... 709/238 |
| 6,256,771 B1 | * | 7/2001 | O'Neil et al. ................ 717/100 |
| 6,496,704 B2 | * | 12/2002 | Yuan ........................... 455/466 |
| 6,622,157 B1 | * | 9/2003 | Heddaya et al. ............. 709/202 |

FOREIGN PATENT DOCUMENTS

| EP | 0 763 807 | 3/1997 |
| WO | WO 97 08906 | 3/1997 |

OTHER PUBLICATIONS

Kotz D et al.; "Agent TCL: Targeting The Needs Of Mobile Computers"; IEEE Internet Computing, Jul.–Aug. 1997, IEEE, USA.; vol. 1, No. 4, pp. 58–67, XP0002078538 ISSN 1089–7801 p. 58, line 1—p. 63, left–hand col., Line 7; p. 65, left–hand col., line 13—p. 66, right–hand column, line 32.

* cited by examiner

Primary Examiner—William Trost
Assistant Examiner—Sharad Rampuria
(74) Attorney, Agent, or Firm—Kenneth A. Haas

(57) ABSTRACT

A data handling system comprising a terminal (122) and a communications network (100), the terminal (122) being capable of communicating with the communications network (100), the network (100) comprising a host platform (124) for receiving an agent (30) associated with the terminal (122), the agent (130) being adapted to communicate, at the platform (124), with the at least one other agent.

9 Claims, 5 Drawing Sheets

DATA HANDLING SYSTEM AND METHOD THEREFOR

FIELD OF THE INVENTION

The present invention relates to a data handling system for use in a communications system, for example, a cellular telecommunications system, such as a Global System for Mobile communications (GSM) system. The present invention also relates to a method of handling data for the data handling system.

BACKGROUND OF THE INVENTION

In a communications system a mobile station (MS) possesses a quantity of information, for example, information relating to services available, link quality, interference levels, remaining cell capacity, information about the surrounding or local environment. However, this information may be of use to other mobile stations.

For example, a traveller owning the MS can be travelling along a motorway. Unbeknown to the traveller, a traffic jam may exist ahead of the traveller as a result of a road accident. Owners of the other mobile stations already forming part of or approaching the traffic jam are in possession of information indicative of the presence and location of the traffic jam. However, the owner of the MS is unable to detect the traffic jam and take action to avoid it.

A system already exists which is capable of warning the owner of the MS of the existence of traffic jams, but requires that the owner of the MS purchases additional hardware, which represents an increased cost to the subscriber.

Another example where the availability of more information to a subscriber would be beneficial is when a subscriber switches on the MS where more than one telecommunications system supports an area outside that of the MS's local environment, for example at an airport. In such circumstances, the MS usually registers with the network currently exhibiting the greatest signal strength and takes no account of any other requirements that the subscriber might have, for example, service capabilities or call charge constraints.

It is therefore an object of the present invention to obviate, or at least mitigate, the above described problems.

SUMMARY OF THE INVENTION

According to the present invention, there is provided a data handling system comprising a terminal and a communications network, the terminal being capable of communicating with the communications network, the network comprising a host platform for receiving an agent associated with the terminal, the agent being adapted to communicate, at the platform, with the at least one other agent.

It is thus possible to provide a communications network having agent capabilities which, additionally, can facilitate a subscriber's ability to detect traffic jams and identify a most suitable local communications network.

According to the present invention, there is also provided a method of handling data in a system comprising a terminal and a communications network, the terminal being capable of communicating with the communications network, the method comprising the steps of: providing a host platform for receiving an agent associated with the terminal, permitting, at the host platform, communication between the agent and at least one other agent.

Other, preferred, features and advantages will become apparent from the accompanying description and appended dependent claims.

BRIEF DESCRIPTION OF THE DRAWINGS

At least one embodiment of the invention will now be described, by way of example, with reference to the accompanying drawings, in which.

DESCRIPTION OF A PREFERRED EMBODIMENT

Figure 1:
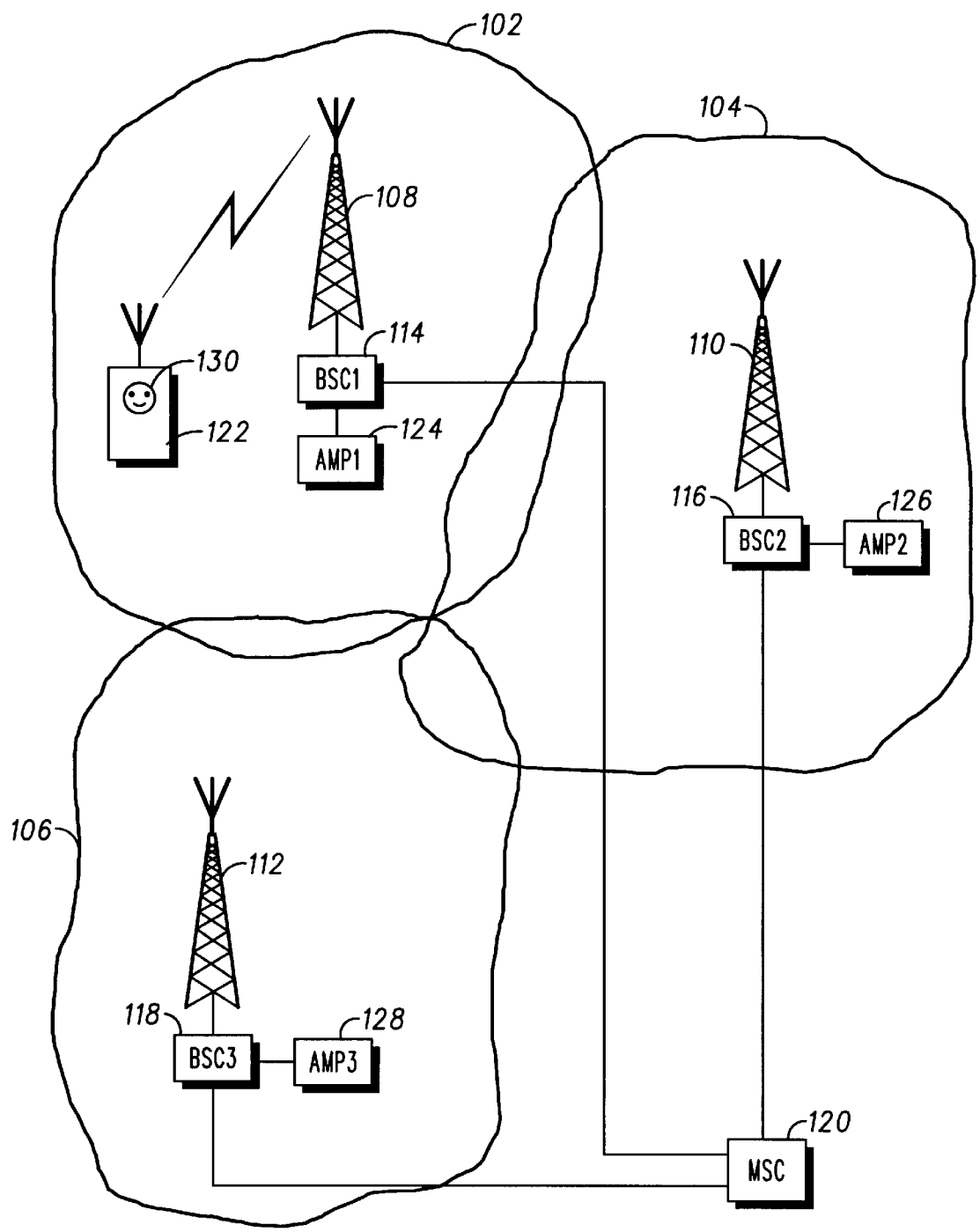
FIG. 1 is a schematic diagram of a system constituting an embodiment of the invention.

A telecommunications network, for example a GSM telephone network 100, comprises a first cell 102, a second cell 104 and a third cell 106 respectively supported by a first base station 108 having a first Base Station Controller (BSC) 114, a second base station 110 having a second BSC 116, and a third base station 112 having a third BSC 118.

The first, second and third BSCs 114, 116, 118 are coupled to a Mobile Switching Centre 120 according to any method known in the art.

For the purpose of simplicity and clarity of description, the foregoing example will be described with reference to a single mobile terminal 122, for example a StarTAC® telephone manufactured by Motorola Limited, located within the first cell 102 and capable of communicating with the first base station 108. However, it should be appreciated that more than one mobile terminal can be provided, capable of operating in any of the first, second or third cells 102, 104, 106.

The mobile terminal 122 is capable of sending a first agent 130, for example an intelligent software agent. The agent is an independent piece of mobile software code capable of migrating from one platform to another platform and is capable of controlling itself through an execution thread and can perform tasks of its own accord. The purpose of the agent is to transfer and receive information as well as execute tasks. The first agent 130 represents the mobile terminal 122 and is, for example, a Java™ applet.

Pieces of existing software code can be encapsulated by or embedded in the first agent 130 and can be specific to the mobile terminal 122. It is thus possible to execute any kind of user-defined function on data gathered by the first agent 130 or provide services offered by existing service providers, for example, stock exchange fluctuation updates or bank account monitoring.

The first, second and third BSCs 114, 116, 118 comprise a respective first, second and third host platform or Agent Meeting Place (AMP) 124, 126, 128. Preferably, an AMP should be provided at each of the first, second and third BSCs 114, 116, 118, but it is not essential to provide the AMP at each of the first, second and third BSCs 114, 116, 118.

In the above and future examples, the AMP has been located at the BSC. However, the AMP can be located elsewhere, for example, at the Mobile Switching Centre (MSC).

The first, second and third AMPs 124, 126, 128 are Agent Systems which can create, interpret, execute and transfer agents. Examples of suitable agent systems are those defined by the Foundation for Intelligent Physical Agents (FIPA) and the Mobile Agent Facility Specification of the Object Management Group (MAF-OMG). Agent systems provide security functions, for example authentication and information confidentiality functions, such as, data encryption.

The first, second and third AMPs 124, 126, 128 are supported by a supporting platform, for example, UNIX or Windows NT) running on a Personal Computer (PC) at each of the first, second and third BSCs 114, 116, 118. It should be noted that a given host platform can support more than one AMP.

Figure 6:
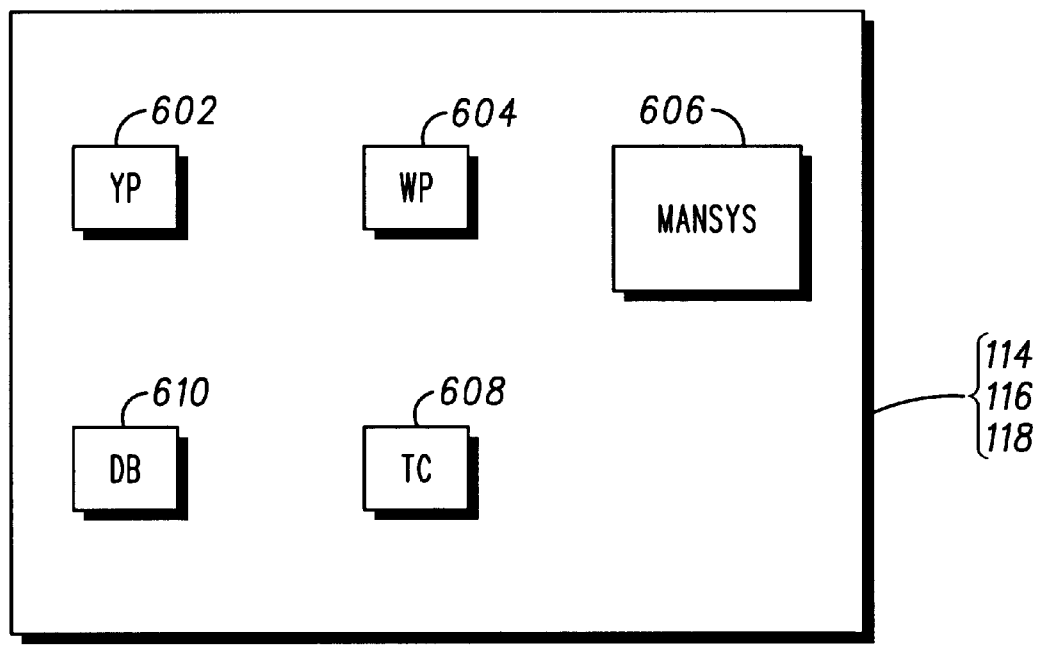
FIG. 6 is a schematic diagram of an agent system for the embodiment of FIG. 1.

The first, second and third AMPs 124, 126, 128 have the structure shown in FIG. 6. The first, second and third AMPs 124, 126, 128 comprise a yellow pages service 602, a white pages service 604, a unique naming service, a management system 606 that controls the life-cycle and mobility of the first agent 130 and a transparent communications service 608. Optionally, the first, second or third AMPs 124, 126, 128 can provide a database facility 610 to store data intended to stay on the AMP platform permanently, even after de-registration of the first agent 414. Communications between the yellow pages service 602, the white pages service 604, the management system 606, the transparent communications service 608, or the database facility 610 can be achieved by providing a respective agent for each of the services or facility. Alternatively, the yellow pages service 602, the white pages service 604, the management system 606, the transparent communications service 608, or the database facility 610 can be a dedicated agent containing the data stored by the yellow pages service 602, the white pages service 604, the management system 606, the transparent communications service 608, or the database facility 610, respectively. The yellow pages service is a service provided to any agent, by the first, second, or third AMP 124, 126, 128 for looking-up services provided by other agents residing locally at the respective AMP. The yellow pages service can optionally search all agent systems forming an agent community. The white pages service is a service which covers all agents which are currently resident on the AMP where the white pages service is located, i.e. locally, for determining the existence of another agent locally.

The addresses of the first, second and third AMPs 124, 126, 128 can be, for example, a phone number or a TCP/IP address and can be known by means of the yellow pages service. A default AMP address is assigned to each agent in order to ensure an initial inter-agent communications can be set up. AMPs can communicate with other AMPs or other agent systems to exchange messages or agents via the transparent communications service 608.

Figure 2:
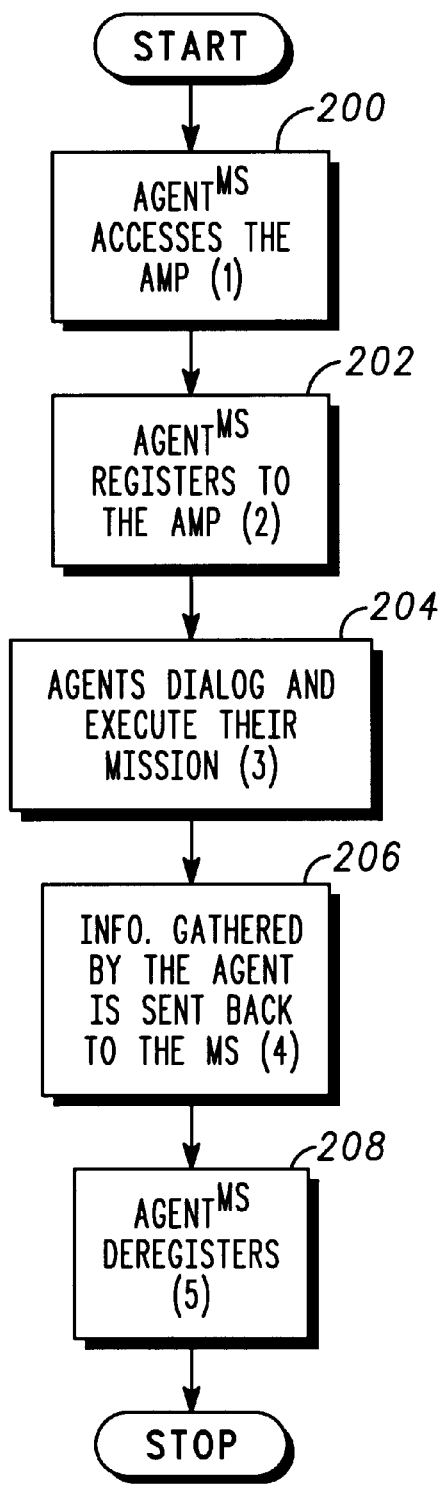
FIG. 2 is a flow diagram of a method for use with the system of FIG. 1.

The migration-cycle of a first agent 130 will now be described with reference to FIG. 2.

Figure 3:
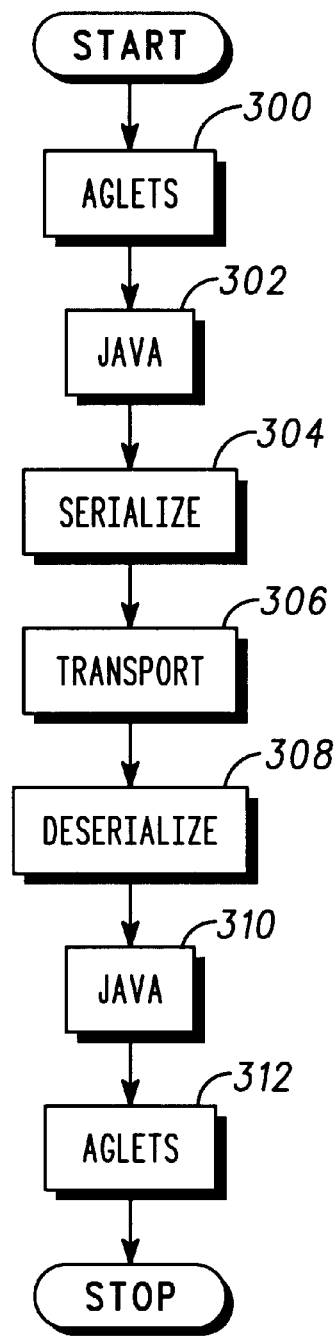
FIG. 3 is a flow diagram of an additional method for use with the system of FIG. 1.

The first agent 130 calls a toll-free number, and establishes a GSM link between the mobile terminal 122 and the first AMP 124. The first agent 130 is written, for example, in an aglet language produced by IBM. The migration of the first agent 130, in the aglet language, will now be described in accordance with the steps shown in FIG. 3.

The first agent 130 resides (step 300) in a memory (not shown) of the mobile terminal 122 on an aglet platform. The first agent 130 is translated through Java on the mobile terminal 122 (step 302) and then serialised (step 304) through the underlying Java layers. The first agent 130 is then transmitted (step 306) to the AMP The first agent 130 is sent, using a TCP/IP protocol known in the art, in packets, using a General Packet Radio Service (GPRS).

Once received, the first agent 130 is then deserialised (step 308), translated back (step 310) through the underlying Java at the first AMP 124 and then reverts to aglet form (step 312). Referring to FIG. 2, access (step 200) to the first AMP 124 is thereby achieved.

The first agent 130 then registers (step 202) to the first AMP 124, in order to register to the yellow pages service, the white pages service and the agent management system of the first AMP 124. The registration procedure uses the security functions defined by the service provider, i.e. authentication and information security mentioned above. Consequently, the first agent 130 becomes known and accessible to any other agents present at the first AMP 124.

During the registration procedure (step 202), the first agent 130 can also provide information, for example, current information about the mobile terminal 122 represented by the first agent 130. The current information about the mobile terminal 122 can include the services capabilities of the mobile terminal 122, for example, third party calling or conference calling, the radio link quality, bit rate, or maximum bit error rate. The current information can be stored in the database facility of the first AMP 124 by the database agent.

The first agent 130 then executes an assigned task or mission (step 204). The assigned task or mission can be a dialogue between the first agent 130 and any other agent residing at the first AMP 124 and/or a referral to the database facility of the first AMP 124. The communication protocol between agents is provided by the first AMP 124, as specified by FIPA Agent Communication Language (ACL). The assigned task can also be the execution of agent code on the first AMP 124, for example, the performance of functions, such as on data. The execution of agent code therefore allows functions to be carried out so as to manipulate the information or data gathered at the first AMP 124.

If necessary, information is sent back to the mobile terminal 122 (step 206). At any time whilst the first agent 130 resides at the first AMP 124, the first agent 130 can send messages to the mobile terminal 122. This information is sent back via a Short Messaging Service (SMS). Also, at any time whilst the first agent 130 resides at the first AMP 124, a message can be sent to the first agent 130 from the mobile terminal 122 in order to update the first agent 130. This can be achieved via the toll-free number or by using the TCP/IP protocol as described above. The structure of the message is defined by various standards bodies, for example, FIPA or MAF-OMG, or by proprietary technology such as Aglets by IBM. The information to update the first agent 130 can be routed to the first agent 130 by means of addressing techniques known in the art, since the first agent 130 and any other agents resident at the first AMP 124 possess specific ID numbers associated with the agents assigned by the unique naming service as described above.

The first agent 130 then de-registers (step 208) from the first AMP 124. De-registration from the first AMP 124 removes all the references to the first agent 130 from the unique naming service, the yellow pages service, and the white pages service. However, the references to the first agent 130 in the database facility of the first AMP 124 are not removed.

The first agent 130 is then either killed or can migrate to another AMP or back to the mobile terminal 122.

Figure 4:
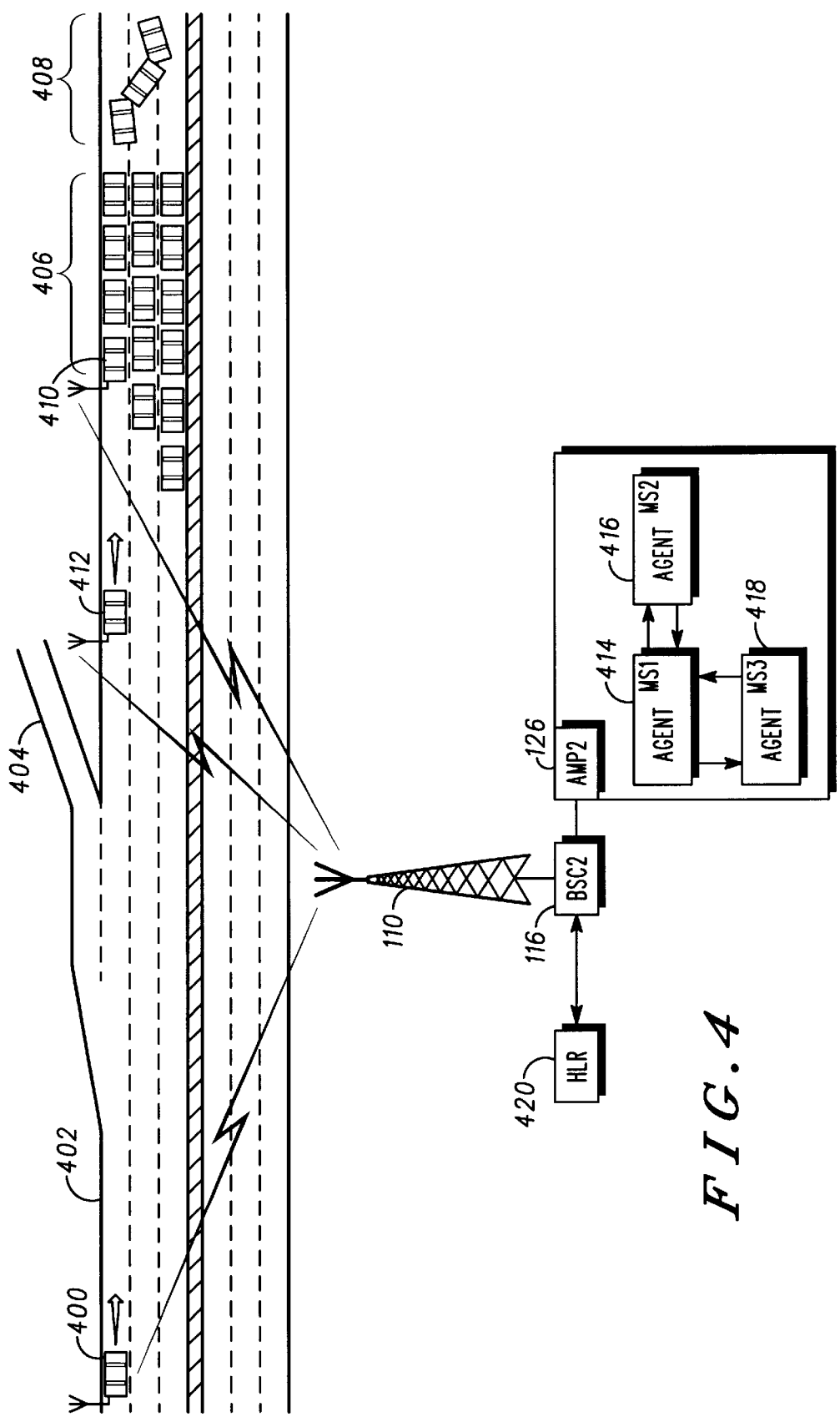
FIG. 4 is a schematic diagram of an example constituting a further embodiment of the present invention.
Figure 5:
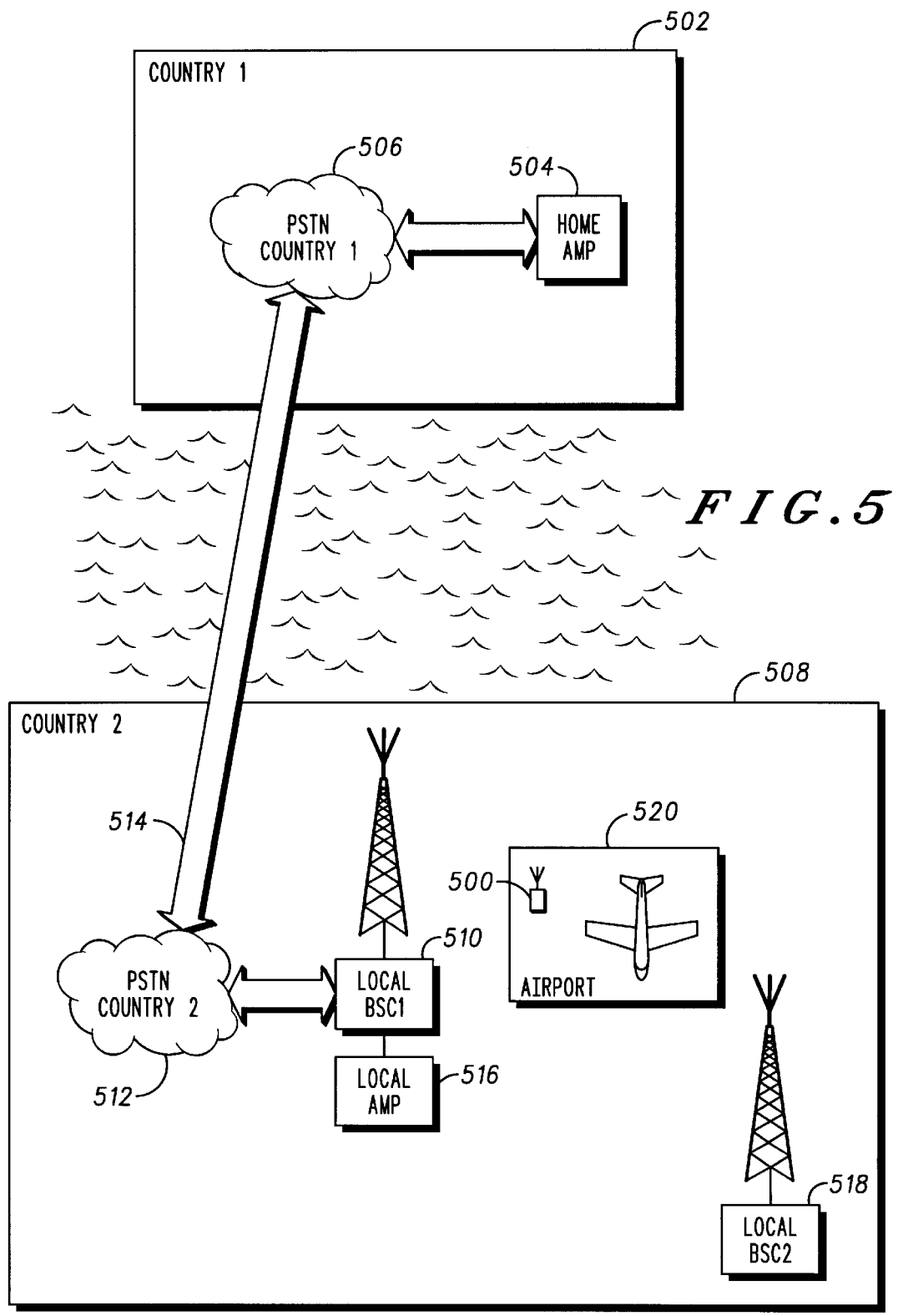
FIG. 5 is a schematic diagram of a further example of constituting another embodiment of the present invention.

Specific applications of the above described technique will now be described with reference to FIGS. 4 and 5.

A first vehicle 400 is travelling along a motorway 402 located within the second cell 104 (FIG. 1). The motorway has a slip-lane 404 for leaving the motorway 402 before a traffic jam 406, caused by a road accident 408, is reached by the first vehicle 400. The vehicles comprising the traffic jam include a second vehicle 410. A third vehicle 412 is also approaching the traffic jam 406 at a reduced speed. The first, second and third vehicles 400, 410, 412 are each equipped with a respective first, second and third mobile terminal (not shown) capable of generating a respective first, second and third agent 414, 416, 418.

The first base station controller 116 is coupled to the second base station 110 which is in communication with the first, second and third vehicles 400, 410, 412.

The first, second and third mobile terminals are capable of respectively determining speed and direction, for example, by being equipped with or coupled to a respective Global Positioning System (GPS) unit. It is thus possible for the first, second and third agents 414, 416, 418 to store information relating to the speed and direction of the first, second and third mobile terminals, respectively.

As the first vehicle 400 travelled along the motorway 402, the first vehicle 400 entered the coverage area of a new cell (in this case the second cell 104) and left the coverage area of an existing cell through which the first vehicle 400 was driving. Thus, it was necessary for the first mobile terminal to register with the second BSC 116 and de-register from the BSC of the existing cell, according to any known handover technique known in the art. When the first mobile terminal registers with the second BSC 116, or if the second BSC 116 is the initial BSC with which the first mobile terminal registers upon being powered-up, the first agent 414 is transmitted (step 200) to the second AMP 116 in accordance with the method already described above.

The same procedure is followed by the second and third agents 416, 418 associated with the second and third vehicles 410, 412, respectively. In this example, it is assumed that the second and third agents 416, 418 have already registered with the second AMP 126.

The first agent 414 then registers (step 202) with the second AMP 126, and provides information to the second AMP 126, for example, the ID of the first agent 414, as well as radio parameters, such as bit rate or level of interference, and the network to which the first mobile terminal is subscribed.

The first agent 414 then access the database facility of the second AMP 126 and exchanges information with the second and third agents 416, 418 already present at the second AMP 126. The first agent 414 then firstly analyses the directional information provided by the second and third agents 416, 418 to ascertain whether the second and third vehicles 410, 412 to which they correspond are travelling or heading in substantially the same direction of the first vehicle. If the direction of the second and third vehicles 410, 412 is substantially the same direction of the first vehicle, the speed information relating to the second and third vehicles 410, 412 is analysed. The fact that the second vehicle 410 is stationary and the third vehicle is moving at the reduced speed indicates the existence of, and approximate distance from the first vehicle 400, of the traffic jam 406.

A message is therefore transmitted (step 206) by the first agent 414 to the first mobile terminal in order to alert the driver of the first vehicle 400 of the existence of the traffic jam 406. The message can be transmitted using a messaging service supported by the network to which the first mobile terminal is subscribed, for example, paging or SMS. The driver of the first vehicle 400 can then take appropriate action in order to avoid the traffic jam 406, for example, by leaving the motorway 402 via the slip-road 404. The first agent 414 can also be provided with additional functionality in order to determine alternative routes for the driver of the first vehicle 400.

When the first mobile terminal has to hand-off from the second BSC 116, the first mobile terminal sends a message to the first agent 414, instructing the first agent to de-register (step 208) from the second AMP 126.

The above described process can then be repeated upon registration with another new cell.

In an alternative example, instead of the first terminal transmitting the first agent 414 to the second BSC 116 for registration with the second AMP 126, the first agent 414 can reside in a Home Location Register (HLR) 420.

When the first mobile terminal registers with the network to which it is subscribed, the second BSC 116 indicates to the HLR 420 that the first mobile terminal has registered and the first agent 414 is transmitted to a local BSC, for example, the second BSC 116 from the HLR 420. With each cell hand-off, the first agent 414 automatically migrates to the new BSC, registers with the new BSC and de-registers form the old BSC as part of the hand-off procedure. The remaining procedures carried out by the first agent 414 is the same as in previous example. It is also conceivable that the second or third mobile terminals and associated second or third agents 416, 418 employ the same technique of being resident in the HLR 400.

It is thus possible to embed the registration and de-registration of the first agent in the existing hand-off mechanisms of the network 100. Therefore, the air interface is only used to transmit messages between the first mobile terminal and the second AMP 126; this reduces the drain on network resources.

Additionally, since the second AMP 126 is also capable of communicating with other agent systems, the second AMP 126 can access existing road traffic services and/or exchange information with the other agent systems.

In another example of the present invention, agents can be used to identify a network best suited to a subscriber when travelling abroad.

A travelling mobile terminal 500 subscribes to a home network in a first country 502, for example, the United Kingdom. A home AMP 504 is coupled to a first Public Switched Telecommunications Network (PSTN) 506 in the first country 502. A first visiting network in a second country 508, for example France, comprises a first visiting base station including a first visiting BSC 510. The first visiting BSC 510 is coupled to a second PSTN 512 which is coupled to the first PSTN 506 according to any technique known in the art, for example, a satellite link or sub-marine fibre-optic link 514. The first visiting BSC 510 is also coupled to a local AMP 516.

A second visiting network having a second visiting base station including a second visiting BSC 518 is also located in the second country 508. The second visiting network offers better services and/or call tariffs as compared with the first visiting network. However, the subscriber of the travelling mobile terminal 500 is not aware of this fact.

When arriving in the second country 508 from the first country 502, for example, at an airport 520, the travelling mobile terminal 500 is powered-up. In accordance with techniques known in the art, the travelling mobile terminal 500 searches for the visiting network able to provide the best signal strength at the current location of the travelling mobile terminal 500. The travelling mobile terminal 500 registers with the network identified as having the best signal strength. In this example, the first visiting network is able to provide the best signal strength. The travelling mobile terminal 500 therefore communicates with the first visiting BSC 510 and registers with the first visiting network. The travelling mobile terminal 500 sends a travelling agent in the same manner as already described above; the travelling agent possesses information about the preferences of the subscriber of the travelling mobile terminal 500.

The travelling agent registers (FIG. 2) with the local AMP 516 (step 202) and consults the database facility and/or the yellow pages service of the local AMP 516 in order to evaluate the available visiting networks according to the preferences of the subscriber. The travelling agent then selects the most appropriate visiting network, in this case the second visiting network, and transmits this information in the form of a message transmitted back to the subscriber (step 206) via the travelling mobile terminal 500.

The travelling agent then de-registers from the local AMP 516 (step 208) and the travelling mobile terminal 500 de-registers from the first visiting network and registers with the, preferred, second visiting network via the second visiting BSC 518.

The travelling agent can also be stored at the home AMP 504. In such a scenario, the travelling agent is sent from the home AMP 504 to the local AMP 516 via the first PSTN 506, the fibre-optic link 514, the second PSTN 512 and the first visiting BSC 510.

What is claimed is:

1. A data handling system comprising a mobile wireless communication terminal and a communications network including a plurality of base stations and corresponding base station controllers, the mobile terminal being capable of communicating with the communications network over wireless links through a local one of said base stations, the network comprising a plurality of host platforms associated with respective ones of said base station controllers for receiving an agent associated with the mobile terminal, said mobile terminal comprising agent generating means for generating an associated agent, said agent comprising an independent piece of itinerant software code capable of migrating from one platform to another platform, capable of controlling itself through an execution thread and capable of performing tasks of its own accord, said agent being adapted to exchange data at said local host platform with at least one other agent and to communicate the data exchanged with said mobile terminal over said wireless links.

2. A system as claimed in claim 1, wherein the data exchanged is transmitted from said agent to the mobile terminal by means of a messaging service of the communications network.

3. A system as claimed in claim 1, wherein the mobile terminal is arranged to hand-off between cells within the communications network having respective base station controllers, the agent of the mobile terminal being adapted to register to a new host platform associated with a new base station controller associated with the new host platform upon registration to a new Base Station Controller.

4. A system as claimed in claim 1, wherein said agent is arranged to identify a second, similar, agent amongst the at least one other agent associated with another mobile terminal having substantially the same direction of travel, and to exchange data at said local host platform with said second agent and to communicate the data with its associated mobile terminal.

5. A system as claimed in claim 4, wherein the second agent resides at the host platform associated with the same base station controller as the first said agent.

6. A system as claimed in claim 1, wherein the host platforms comprise Agent Meeting Place databases for providing information to said agent as to other agents currently resident at the corresponding host platforms.

7. A system as claimed in claim 6, wherein the host platforms comprise database a gents for interfacing between the first said agent and the databases.

8. A system as claimed in claim 6, wherein the agent is adapted to de-register from the platform under predetermined circumstances while leaving information on the database.

9. A method of handling data in a system comprising a mobile wireless communication terminal and a communications network including a plurality of base stations and corresponding base station controllers, the mobile terminal communicating with the communications network over wireless links through a local one of said base stations, the system including a plurality of host platforms associated with respective ones of said base station controllers for receiving an agent associated with the mobile terminal, said agent comprising an independent piece of itinerant software code capable of migrating from one platform to another platform, capable of controlling itself through an execution thread and capable of performing tasks of its own accord, and said agent exchanging data at said local host platform with at least one other agent and communicating the data exchanged with said mobile terminal over said wireless links.

* * * * *